(12) United States Patent
Holland et al.

(10) Patent No.: US 9,200,517 B2
(45) Date of Patent: Dec. 1, 2015

(54) DEVICE AND METHOD FOR REPAIRING A FORWARD FRAME V-BLADE IN AN AIRCRAFT ENGINE

(71) Applicant: United Technologies Corporation, Hartford, CT (US)

(72) Inventors: Brian Kenneth Holland, Lansing, MI (US); Michael J. Madel, Jr., Colchester, CT (US); William Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/325,066

(22) Filed: Jul. 7, 2014

(65) Prior Publication Data

US 2015/0184513 A1    Jul. 2, 2015

Related U.S. Application Data

(62) Division of application No. 12/828,836, filed on Jul. 1, 2010, now Pat. No. 8,769,814.

(60) Provisional application No. 61/270,335, filed on Jul. 6, 2009.

(51) Int. Cl.
*F01D 5/00* (2006.01)
*B23P 6/00* (2006.01)
*F01D 5/14* (2006.01)

(52) U.S. Cl.
CPC ................ *F01D 5/005* (2013.01); *B23P 6/005* (2013.01); *F01D 5/141* (2013.01); *F05B 2260/301* (2013.01); *Y10T 29/4932* (2015.01); *Y10T 29/49316* (2015.01); *Y10T 29/49318* (2015.01); *Y10T 29/49321* (2015.01); *Y10T 29/49721* (2015.01)

(58) Field of Classification Search
CPC .................................... F01D 5/005; F01D 5/06
See application file for complete search history.

(56) References Cited

U.S. PATENT DOCUMENTS

| 4,517,038 | A | 5/1985 | Miller |
| 5,023,987 | A | 6/1991 | Wuepper et al. |
| 7,210,909 | B2 * | 5/2007 | Escure et al. ............. 416/198 A |
| 8,769,814 | B2 | 7/2014 | Holland et al. |
| 2009/0258185 | A1 | 10/2009 | Holland et al. |

* cited by examiner

*Primary Examiner* — Richard Chang
(74) *Attorney, Agent, or Firm* — Miller, Matthias & Hull LLP

(57) ABSTRACT

A repair device and method for repairing a forward frame v-blade on an aircraft engine are described in which the repair device replaces a section of the forward frame v-blade. In one embodiment, the repair device includes a repair part and a splice plate, the combination of which is secured to the forward frame v-blade. The repair part includes a repair part web and a pair of stiffening legs with a leg thickness that is greater that the thickness of corresponding flanges on the forward frame v-blade. The splice plate is configured to accommodate for the increased thickness of the stiffening legs, providing by way of example a reduced thickness area compatible with the repair part. Fasteners such as rivets are used to couple the repair device to the splice plate, and to couple the splice plate to the forward frame v-blade.

6 Claims, 6 Drawing Sheets

DEVICE AND METHOD FOR REPAIRING A FORWARD FRAME V-BLADE IN AN AIRCRAFT ENGINE

CROSS-REFERENCE TO RELATED APPLICATIONS

This application is a divisional under 35 U.S.C. §121 of U.S. patent application Ser. No. 12/828,836 filed on Jul. 1, 2010, which claims the benefit of priority under 35 U.S.C. §119(e) from U.S. Provisional Patent Application Ser. No. 61/270,335, and filed on Jul. 6, 2009.

TECHNICAL FIELD

The present invention relates generally to aircraft and aircraft engines, and more particularly, to a device and a method of implementing the device to repair a forward frame v-blade located in the nacelle of the aircraft engine

BACKGROUND

Components of aircraft engines may develop cracks and other formations that degrade performance of the component and/or cause other more catastrophic failures in the engine. Cracks may form in certain components that must be replaced in their entirety. However, because of the scale, size, complexity, and cost, replacement of such components is fundamentally undesirable. A more advantageous solution would therefore be to repair these components while still in place, thus avoiding costly maintenance and repair.

SUMMARY

There is described below embodiments of a device and method for repairing components of gas turbine engines without having to remove the damaged component. The proposed repair includes a repair part and a corresponding splice plate, each being configured with features that improve the mechanical properties of the component in its repaired condition. Such features include, for example, one or more selected dimensions that, while being different than corresponding dimensions of the component, fit within the envelope defined by the repair component to permit continued operation of the component in its repaired condition.

Further discussion of these and other features is provided below in connection with one or more embodiments, examples of which appear immediately below:

In one embodiment, a repair device for a forward frame v-blade in a gas turbine engine on an aircraft, the forward frame v-blade including a v-blade cross-section with an upper v-blade flange and a lower v-blade flange. The repair device comprises a repair part including a repair part web and a pair of stiffening legs extending from the repair part web in manner forming a channel. The repair device also comprises a splice plate disposed in the channel, the spice plate including a splice plate body having a stepped region for engaging the repair part and the forward frame v-blade. The repair device further comprises an array of fasteners coupling the repair part and the splice plate. The repair device further described wherein the stepped region delineates between a repair part engagement area and a v-blade engagement area, wherein the repair part is coupled to the repair part engagement area, and wherein the stiffening legs have a leg thickness that is greater than the thickness of upper v-blade flange and the lower v-blade flange.

In another embodiment, in a gas turbine engine for an aircraft, a forward frame v-blade comprises a circumferential shape disposed about the gas turbine engine, the circumferential shape having a v-blade cross-section with an upper v-blade flange, a lower v-blade flange, and a v-blade web extending therebetween. The forward frame v-blade also comprises a splice plate coupled to the circumferential shape, the splice plate including a splice plate body having a repair part engagement area and a repair part coupled to the repair part engagement area. The forward frame v-blade further comprises an array of fasteners extending through the repair part, the splice plate, and the circumferential shape. The forward frame v-blade further described wherein the repair part includes a pair of stiffening legs that have a leg thickness that is greater than the thickness of upper v-blade flange and the lower v-blade flange.

In yet another embodiment, a method for repairing an aircraft engine including a nacelle in which is disposed one or more thrust reversers and a forward frame v-blade subject to damage from the thrust reversers. The method comprises one or more steps for exposing a repair section of the forward frame v-blade, removing a portion of the repair section forming an exposed end of the forward frame v-blade, and coupling a splice pate proximate the exposed end. The method further described wherein a repair part is coupled to the splice plate, wherein an array of fasteners is used to couple the splice plate to the forward frame v-blade and to the repair part, and wherein the repair part includes a repair part web and a pair of stiffening legs which in combination with the splice plate and the fasteners causes a bending stress that does not exceed the bending stress for the forward frame v-blade as measured at the repair part web.

BRIEF DESCRIPTION OF THE DRAWINGS

So that the manner in which the above recited concepts of the present disclosure may be understood in detail, a more particular description is provided by reference to the embodiments, which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

Concepts of the present disclosure are useful to repair components of gas turbine engines. These components are typically subject to loading that can cause cracking of the component structure. Because this cracking weakens the component, repair is required to prevent further damage. Instead of removing and replacing the damaged component in its entirety, however, there is provided in the discussion below embodiments of a repair device, and methods for implementation thereof, that can be used to repair the damaged component substantially in place in the nacelle. This feature is beneficial because it can substantially reduce costs associated with repair (e.g., labor and material costs), as well as to provide a repaired structure that may be mechanically and functionally superior to the original component before the damage occurred.

Figure 1:
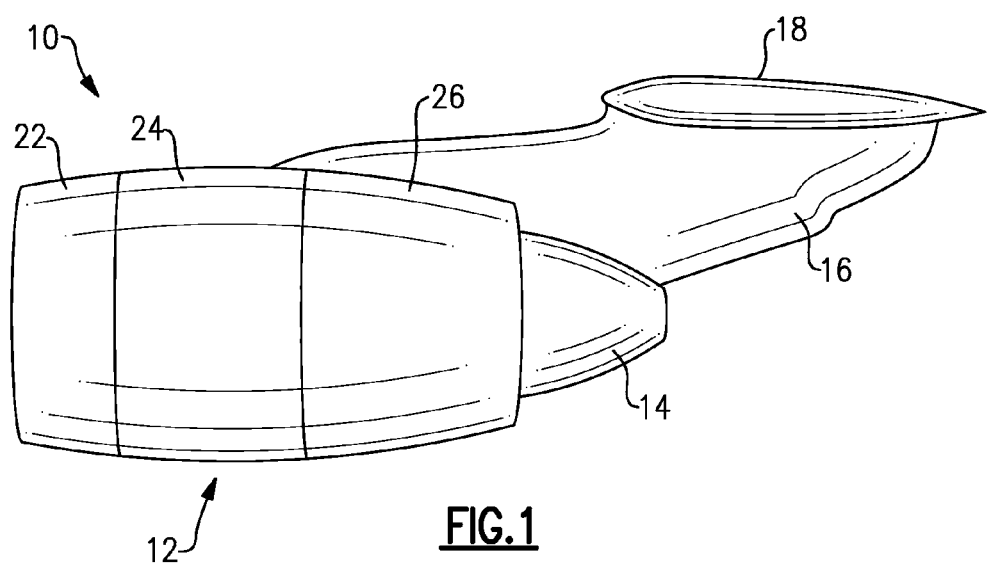
FIG. 1 is a schematic of a nacelle of a gas turbine engine attached to a pylon of an aircraft and including a thrust reverser.
Figure 2:
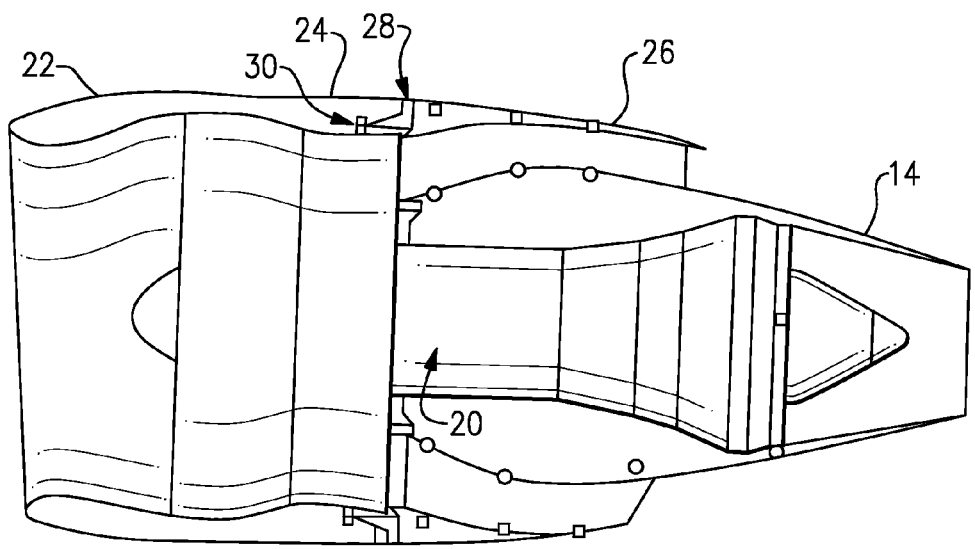
FIG. 2 is a side, partial cross-section, schematic of the nacelle of FIG. 1 that illustrates a torque box and a forward frame v-blade arranged about a gas turbine engine.

With reference now to FIGS. 1-4, repairs of the type contemplated herein can be implemented in aircraft and more particularly in connection with the components of aircraft engines. For example, there is depicted in FIGS. 1 and 2 a schematic of an aircraft 10 that includes a nacelle 12, an exhaust nozzle 14, a pylon 16, and a wing 18. The nacelle 12 functions as an outer casing for a gas turbine engine 20, this casing being formed of an inlet cowl 22, a fan cowl 24, and a thrust reverser 26. Inside of the nacelle 12 there is found a torque box 28 that has a forward frame v-blade 30.

Figure 3:
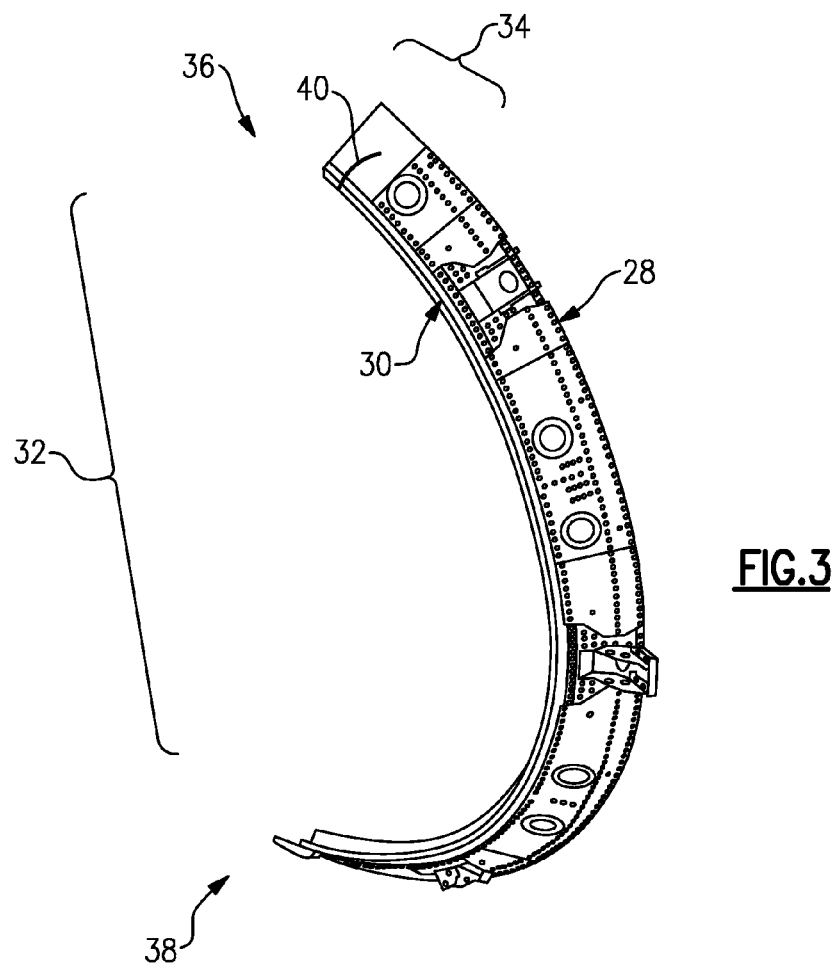
FIG. 3 is a perspective view of the torque box of FIG. 2.
Figure 4:
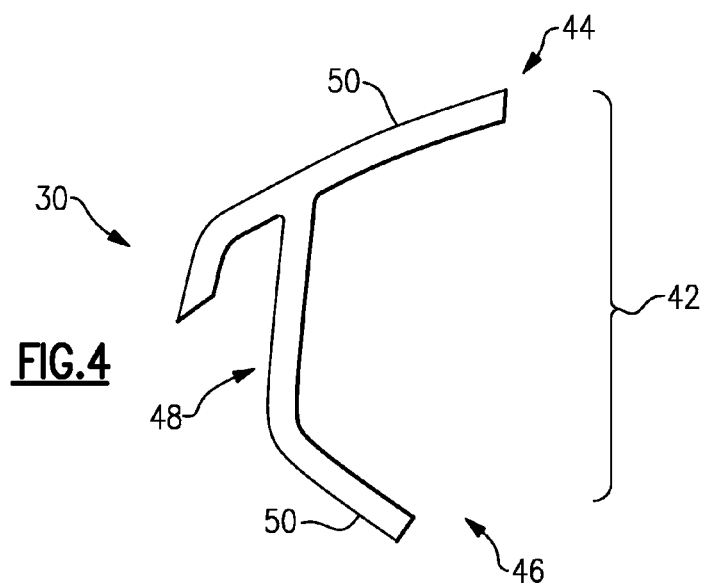
FIG. 4 is a end view of the forward frame v-blade of the torque box of FIG. 3.

As best illustrated in FIGS. 3 and 4, the forward frame v-blade 30 has a circumferential shape 32, which typically extends 180° about the gas turbine engine 20. The circumferential shape 32 terminates in a repair section 34, which can be located throughout the circumferential shape 32. These locations include, but are not limited to, a twelve-o'clock repair section 36 and a six-o'clock repair section 38 located at the extremities of the forward frame v-blade 30. Of course the concepts herein are likewise applicable, however, to other locations of the repair section 34 as based for example on the type of aircraft 10 and/or gas turbine engine 20. The repair section 34 is generally susceptible to crack formation 40 such as stress-related cracking caused by misalignment and related assembly defects in the components of the forward frame v-blade 30. Crack formation 40 propagates by further operation of the thrust reverser 26.

The forward frame v-blade 30 has a v-blade cross-section 42 with an upper v-blade flange 44, a lower v-blade flange 46, and a v-blade web 48 extending therebetween. The upper v-blade flange 44 and the lower v-blade flange 46 each have an outer surface 50, which in one implementation forms the outer boundaries for the repair device. In one example, while the repair device fits within these outer boundaries, thus permitting operation of the forward frame v-blade 30 in its repaired condition, the repair device is also configured with improved mechanical properties so as to resist crack formation 40 in the forward frame v-blade 30 in its repaired condition.

As a relatively high level example, the details of which are discussed below, to repair the cracking 36 in the repair section 34, the repair device comprises a repair part and a splice pate. When used in combination, the repair part and the splice plate replace the repair section 34 in which the cracking 36 has formed. The repair part has features that in one example are similar to those features of the v-blade cross-section 42. These features permit functioning of the forward frame v-blade 30 as was possible before the repair. To further facilitate this functionality, the splice plate couples the repair part to the forward frame v-blade 30 proximate the repair section 34 in a manner that maintains the structural integrity of the forward frame v-blade 30.

Figure 5:
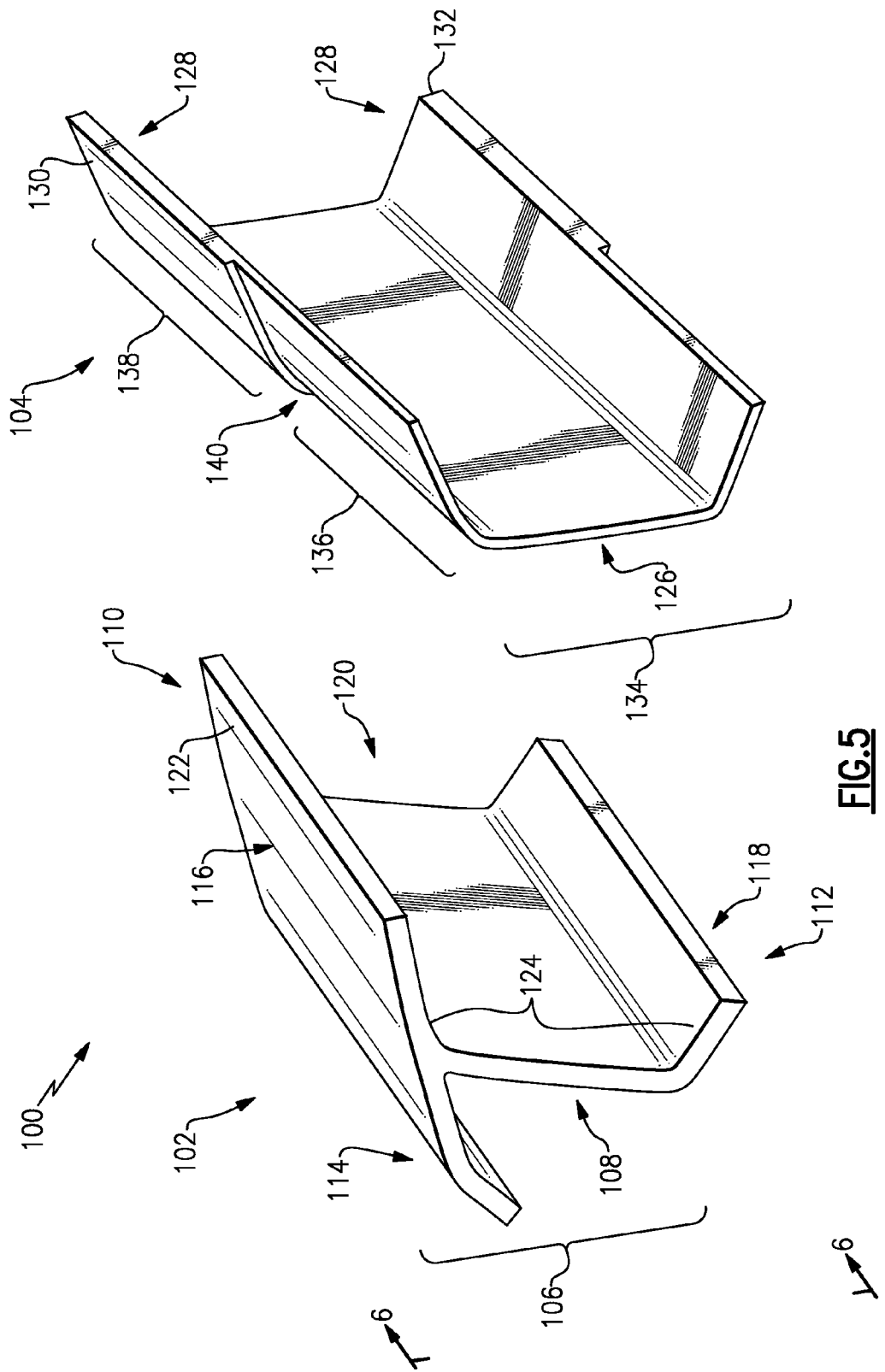
FIG. 5 is a side, perspective, exploded assembly view of an exemplary embodiment of a repair device.
Figure 6:
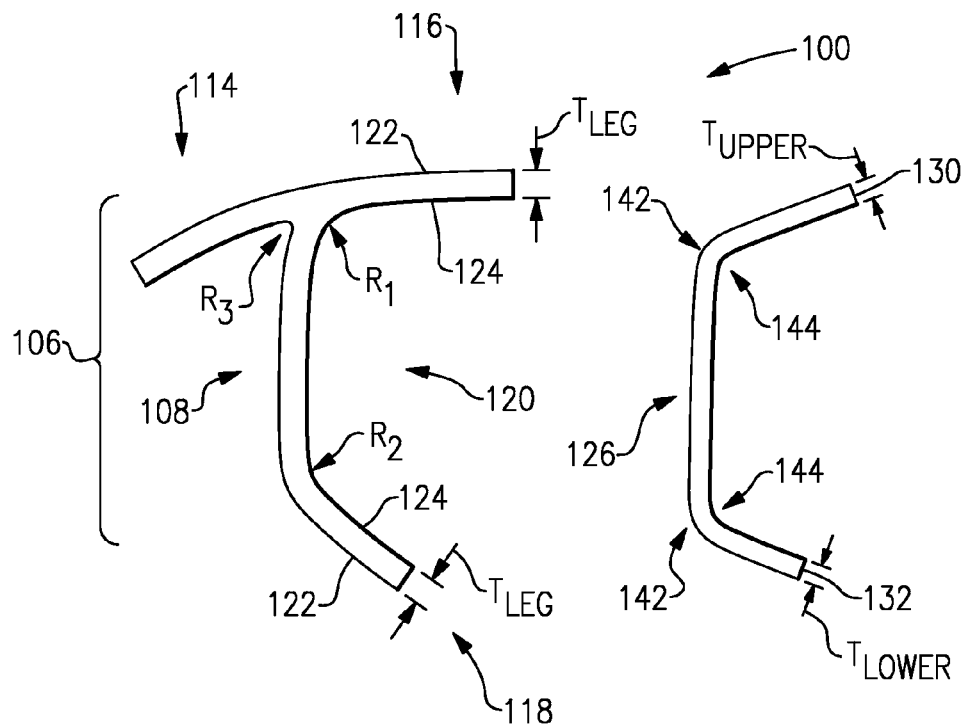
FIG. 6 is a side view of the repair device of FIG. 5.

For further discussion of the concepts briefly outlined above, and with continued reference to FIGS. 3 and 4, reference can now be had to FIGS. 5 and 6, in which there is depicted an exemplary embodiment of a repair device 100. The repair device 100 includes a repair part 102 and a splice plate 104. The repair part 102 is used to replace the repair section (e.g., the repair section 34 (FIG. 3)), which in one implementation is removed from the forward frame v-blade 30 as part of the repair method outlined below. The repair part 102 has a repair part body 106 configured with features similar to the v-blade cross-section 42 and that includes a repair part web 108, an upper flange 110, and a lower flange 112. The upper flange 110 includes a forward portion 114 and an upper stiffening leg 116 that extends rearwardly away from the repair part web 108. The lower flange 112 includes a lower stiffening leg 118 that also extends from the repair part web 108 so as to form with the upper stiffening leg 116 a channel 120 into which is disposed the splice plate 104. Each of the upper stiffening leg 116 and the lower stiffening leg 118 have an outer surface 122, an inner surface 124 that forms an inner radii (e.g., inner radii $R_1$ and $R_2$, respectively) with the repair part web 108, and a leg thickness $T_{LEG}$. An outer radius $R_3$ is formed opposite the inner radius $R_1$.

The splice plate 104 includes a splice plate web 126 and a pair of elongated members 128. The elongated members 128 include an upper elongated member 130 and a lower elongated member 132 each having, respectively, an upper member thickness $T_{UPPER}$ and a lower member thickness $T_{LOWER}$. Together the splice plate web 126, the upper elongated member 130, and the lower elongated member 132 form a splice plate body 134 with a repair part engagement area 136 and a v-blade engagement area 138. A stepped region 140 delineates between the repair part engagement area 136 and the v-blade engagement area 138. The splice plate body 134 also has a pair of outer splice plate radii 142 and a pair of inner splice plate radii 144, which are formed at the interface of the splice plate web 126 and the elongated members 128.

Each of the repair part 102 and the splice plate 104 can be constructed monolithically such as by way of machining, bending, extruding, casting, and related techniques for manipulating material into appropriate shapes. These materials include aluminum, steel, magnesium, and titanium. Each piece of the repair device 100 can be designed so as to be machined from a separate billet of aluminum, or in one alternative construction the repair part 102 and the splice plate 104 can be machined from the same billet of material. The latter, i.e., monolithic construction of the repair part 102 and the splice plate 104 is beneficial because it eliminates the need to fastening together the separate pieces. Other construction of one or more pieces of the repair device 100 may likewise comport with assembly techniques in which, for example, multiple pieces are assembled together to form the repair part 102 and/or the splice plate 104. In such construction, fasteners such as welds, screws, bolts, and rivets may be used to secure the various pieces together as needed.

As mentioned above, dimensions and construction of the repair part 102 are generally selected to permit continued operation of the forward frame v-blade 30 within the nacelle 12. To prevent further damage such as the crack formation 40, however, embodiments of the repair device 100 can be configured so that portions of the repair device 100 (e.g., the repair part 102 and/or the splice plate 104) are more resilient, stronger, or otherwise constructed with improved mechanical properties as compared to, e.g., the repair section 34. Such improvements can be effectuated by way of material selection, manufacturing techniques, as well as design criteria such as dimension selection for all and/or part of the repair part 102. In context with the concepts disclosed herein, since crack formation 40 often occurs in areas proximate the outer radius $R_3$, the inner radius $R_1$ and the outer radius $R_3$ can be larger than the corresponding radii of the v-blade cross-section 42. In one example, the inner radius $R_1$ and the outer radius $R_3$ are at least about 0.125 in larger than such corresponding radii.

Dimensions can also be determined based on structural analysis such as by way of modeling the loading on, e.g., the repair part web 108. This modeling can be used to identify values for the dimensions of particular portions of the repair part 102 and/or the splice plate 104. Values for the inner radii $R_1$ and $R_2$ and the outer radius $R_3$, the leg thickness $T_{LEG}$, the upper member thickness $T_{UPPER}$ and the lower member thickness $T_{LOWER}$, as well as other dimensions for the repair part 102 and the splice plate 104 can, for example, be determined by modeling the repair part web 108 as a cantilever beam and comparing the bending stress of the combination of the repair part web 108 (the "repaired stress") and the splice plate web 126 to the bending stress of the v-blade web 48 in its unrepaired condition (the "nominal stress"). In one embodiment, the repair device 100 is configured such as by selection of dimensions so that the repaired stress does not exceed about 77% of the nominal stress. In yet another embodiment, the repair device 100 is configured so that the repaired stress is about 26% of the nominal stress.

Figure 7:
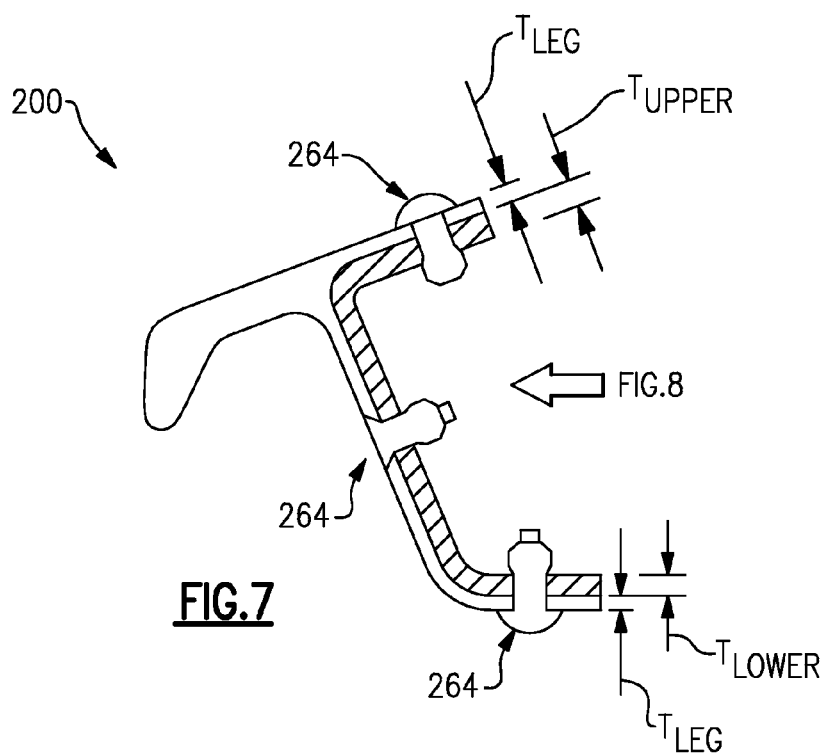
FIG. 7 is a side view of another exemplary embodiment of a repair device.
Figure 8:
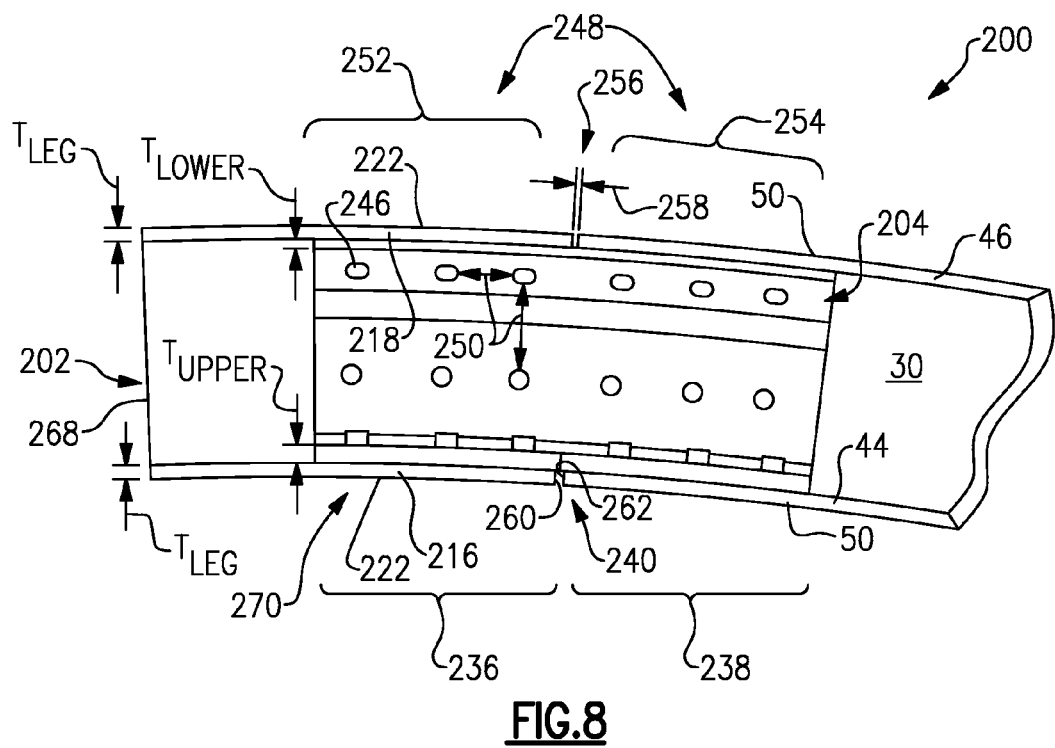
FIG. 8 is a rear view of the repair device of FIG. 7.

Turning next to FIGS. 7 and 8, there is provided another exemplary embodiment of a repair device 200, which is depicted as implemented on a forward frame v-blade 30. Like numerals are used to identify like components of the repair device 200, except that the numerals are increased by 100 (e.g., 100 is now 200 in FIGS. 7 and 8). For example, the repair device 200 includes a repair part 202 and a splice plate 204. Positive recitation of other common components and features as between the repair device 100 and the repair device 200 is not provided herein, however, unless necessary for the discussion and or clarification of the concepts related to the repair device 200 or otherwise contemplated herein.

The repair device 200 includes a plurality of openings 246 that extend through the splice plate 204, the repair part 202, and the forward frame v-blade 30. These openings 246 are arranged in arrays 248 that are defined by spacing 250 among and between the openings 246. The arrays 248 include a repair part array 252 and a v-blade array 254, the latter (i.e., the v-blade array 254) being used to couple the repair device 200 to the forward frame v-blade 30 proximate the repair section 34. This coupling can form a joint 256 with a gap 258 as between an end 260 of the repair part 202 and an exposed portion 262 of the repair section 34 on the forward frame v-blade 30. The joint 256 is secured using one or more fasteners 264 that are positioned in each of the openings 246, thus effectuating the coupling of the repair device 200 and the forward frame v-blade 30.

Fasteners for use as the fasteners 264 include rivets, screws, bolts, and other implements that are compatible with the loading and stress conditions contemplated herein. When rivets are utilized, it may be desirable to use aircraft-grade rivets, and more particularly rivets with a nominal body diameter of at least about 0.15 in. In another example, the nominal body diameter depends on or is selected in accordance with the material thickness for one or more of the repair part 202 and the splice plate 204, including the leg thickness $T_{LEG}$, the upper member thickness $T_{UPPER}$ and the lower member thickness $T_{LOWER}$. In yet another example, the rivets comprise one or more of size 5 and size 6 rivets. Moreover, the number and placement of the rivets, as defined for example by the location of the openings 246, can be selected in accordance with the modeling and analysis of the repair device 200. In one embodiment, nine (9) rivets in, e.g., a three (3) by three (3) array, is suitable for securing the repair device 200 to the forward frame v-blade 30. Likewise a similar number of rivets can be used to secure the repair part 202 to the splice plate 204.

An end 268 of the repair part 202 opposite the joint 256 can be left generally unsupported such as by extending the splice plate 204 across only a supported portion 270 of the repair part 202. The length of the portion left unsupported as measured from the unsupported end 268 is in one embodiment selected to avoid interference between the splice pate 204 and latching mechanisms that are typically used in connection with the forward frame v-blade 30 and/or the torque box 28 (FIGS. 2 and 3). Generally the length of the splice plate 204 can be based on the nominal body diameter of the fasteners (e.g., the rivets), wherein the determination of the length may be calculated as a multiple of the nominal body diameter. By way of example, and when implemented on, e.g., the repair device 100 and 200, the distance from the opening for the rivet to the end (e.g., the unsupported end 268) is about two (2) to about four (4) times the nominal body diameter and the distance from rivet to rivet is from about three (3) to twelve (12) times the nominal body diameter. In one example, the resulting length of the splice plate 204 is at least about 2.5 in. In another example, the resulting length of the splice plate is from about 3 in to about 12 in.

The size of the gap 266 can vary within, for example, accepted tolerances and other dimensioning standards as related to, e.g., manufacturing and assembly of the repair device 200 to the forward frame v-blade 30. Embodiments of the repair device 200 can be configured so that the end 260 is disposed in abutting relation (e.g., partial and/or full contact) to the exposed portion 262. In other embodiments, the end 260 is in spaced relation to the exposed portion 262 so that the gap 266 does not exceed about 0.005 in.

As depicted in FIG. 7, the outer surfaces 222 of the repair part 202 are substantially planar with the outer surface 50 of the forward frame v-blade 30. This configuration permits operation of the forward frame v-blade 30 in its repaired condition. Noted in the present example, however, is that the leg thickness of the upper stiffening leg 216 and the lower stiffening leg 218 is greater than the v-blade flange thickness of the upper v-blade flange 44 and the lower v-blade flange 46. In one example, the difference between the leg thickness and the v-blade flange thickness is at least about 0.30 in. In yet another example, the difference is determined in accordance with modeling such as the modeling discussed above.

The upper member thickness $T_{UPPER}$ and the lower member thickness $T_{LOWER}$ can likewise vary as between the upper elongated member 230 and a lower elongated member 232. Such variations can be commensurate with the selected thicknesses and related dimensions for the repair part 202 and/or the splice plate 204. In one embodiment, the upper member thickness $T_{UPPER}$ is greater than the lower member thickness $T_{LOWER}$. Moreover, the stepped region 240 of the splice plate 204, which delineates the repair part engagement area 236 from the v-blade engagement area 238, is selected to maintain the planarity of the outer surfaces of the repair part 202 and the forward frame v-blade 30, but to accommodate for the increased leg thickness of the upper stiffening leg 216 and the lower stiffening leg 218.

Figure 9:
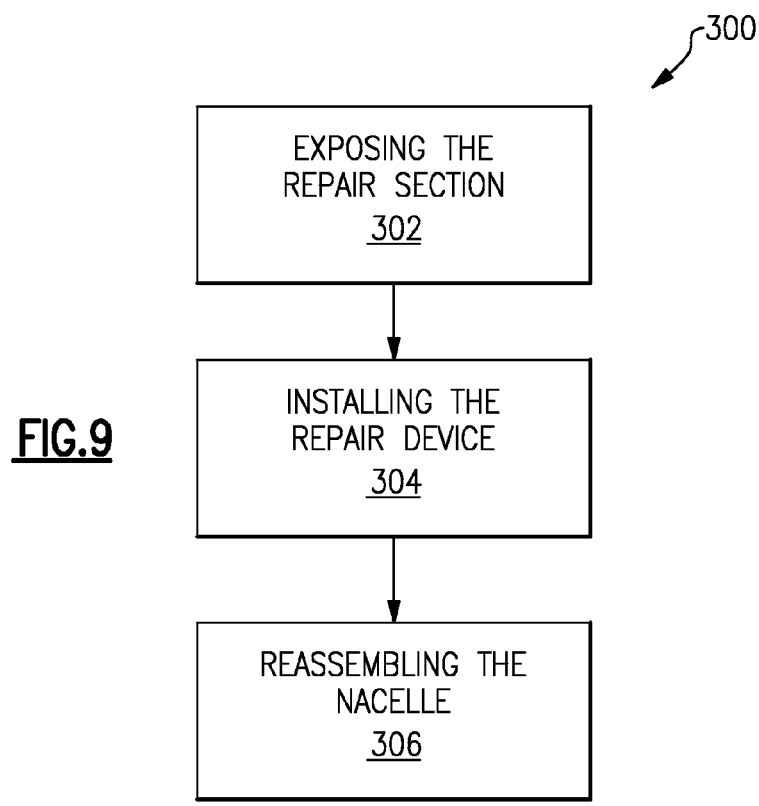
FIG. 9 is a flow diagram of an exemplary embodiment of a method for repair a forward frame v-blade using a repair device such as the repair device of FIGS. 5-8.
Figure 10:
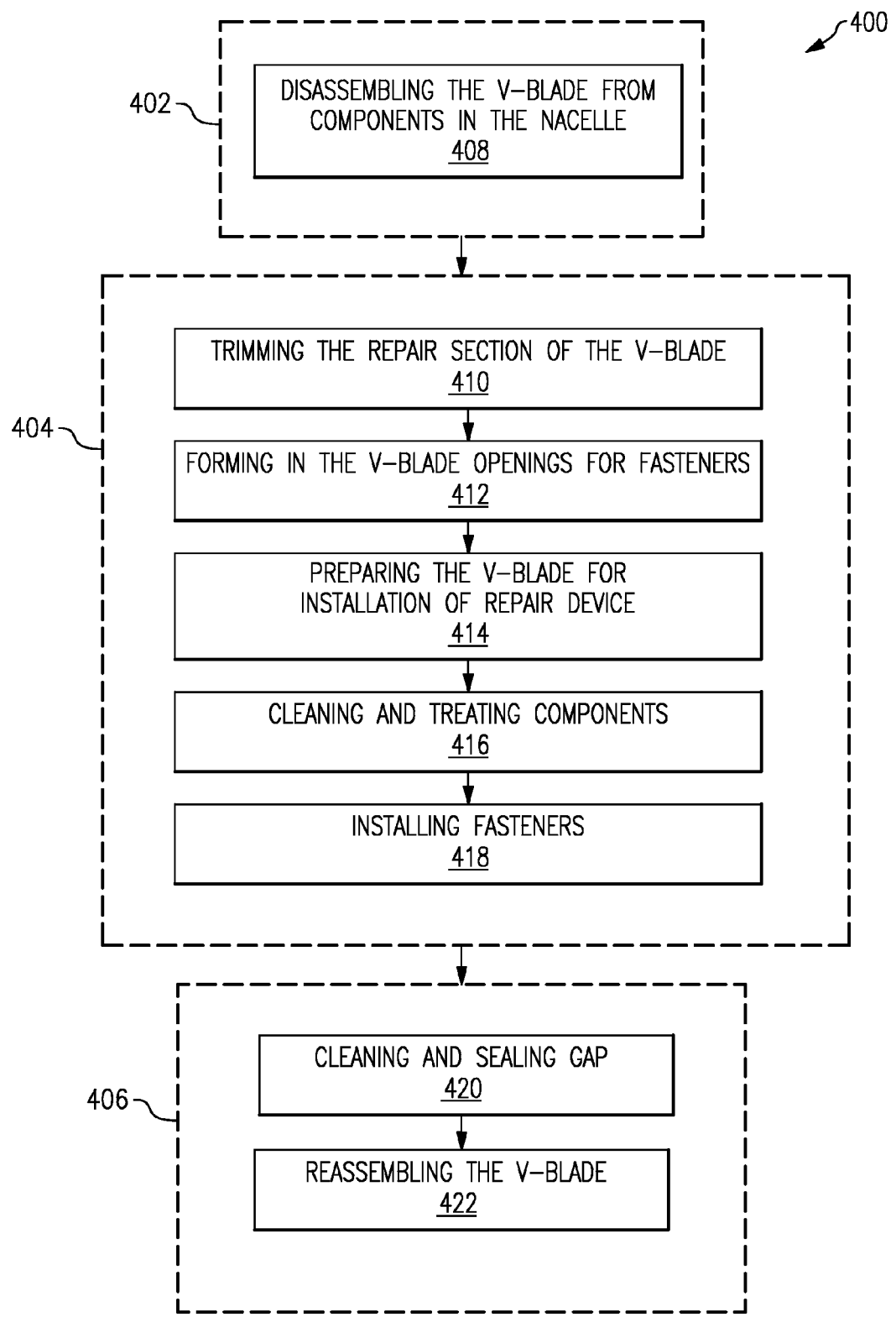
FIG. 10 is a flow diagram of another exemplary embodiment of a method for repair of a forward frame v-blade using a repair device such as the repair device of FIGS. 5-8.

The repair device 100 (FIGS. 5 and 6) and 200 are configured for implementation in a method for repairing and/or refurbishing the forward frame v-blade 30 within the nacelle 12 (FIG. 1). Exemplary embodiments of such method, as outlined in the blocks of methods 300 and 400 depicted in FIGS. 9 and 10 are discussed in more detail below. While reference may be made to particular pieces and components, e.g., the repair device 200, the steps and processes that are provided are equally applicable to other embodiments, configurations, and implementations of the concepts presented in the present disclosure.

Referring first to FIG. 9, and generally to FIGS. 1-4, 7, and 8, the method 300 includes, at block 302, exposing the repair section 34 of the forward frame v-blade 30, at block 304, installing the repair device 200, and at block 306, reassembling the nacelle 12. The method 300 takes advantage of the various features of repair devices such as the repair device 200 because the process of repairing, e.g., the engine of an aircraft, does not require extensive dismantling of the components in the nacelle 12. Rather the method 300 can be utilized as an alternative to replacing the forward frame v-blade 30 in its entirety from the nacelle 12 to fix the damage. Whereas such replacement results in the expenditure of labor and money to tear down the aircraft engine, as well as lost revenue due to the inactivity of the aircraft, implementation of the method 300 to install the repair device 200 can be completed in less than about 5% of the time of conventional replacement.

Expanding on the general concepts of the method 300, and with reference now to FIG. 10, it is seen that the method 400 includes a variety of steps for repairing the forward frame v-blade 30 in the nacelle 12. Similar to the method 300 discussed above, the method 400 also includes at block 402, exposing the repair section 34 of the forward frame v-blade 30, at block 406, installing the repair device 200, and at block 404, reassembling the nacelle 12. In the present example, the method 400 also includes, at block 408, disassembling the forward frame v-blade 30 from components in the nacelle 12 including the torque box 28, at block 410, trimming the repair section 34 of the forward frame v-blade 30 and, at block 412, forming in the forward frame v-blade 30 openings (e.g., openings 246) for fasteners 264. The method 400 also includes, at block 414, preparing the forward frame v-blade 30 for installation of the repair device 200, which can include, at block 416, cleaning and treating components including the repair part 202, the splice plate 204, and the exposed portion 262 of the forward frame v-blade 30. The method 400 further includes, at block 418, installing the fasteners 264 through the splice plate 204 into the forward frame v-blade 30, at block 420, cleaning and sealing the gap 258, and at block 422, reassembling the forward frame v-blade 30 such as by reassembling the torque box 28 and related components.

In one embodiment, the method 400 can be utilized to repair one or more of the twelve-o'clock repair section 36 and the six-o'clock repair section 38 of the forward frame v-blade 30, both of which are readily susceptible to damage. For purposes of the present example, trimming of the repair section (e.g., the twelve-o'clock repair section 36 and the six-o'clock repair section 38) can remove at least about 6 in, and in one example at least about 6.25 in, of the repair section 34. This trimming removes sufficient material so as to permit placement of the repair device 200.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values may include the actual value that is expressly stated, as well as other values that are, or may be, the decimal, fractional, or other multiple of the actual value indicated, and/or described in the disclosure.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. In a gas turbine engine for an aircraft, a forward frame v-blade comprising:
    a circumferential shape disposed about the gas turbine engine, the circumferential shape having a v-blade cross-section with an upper v-blade flange, a lower v-blade flange, and a v-blade web extending therebetween;
    a splice plate coupled to the circumferential shape, the splice plate including a splice plate body having a repair part engagement area;
    a repair part including a channel, the repair part engagement area disposed in the channel, the repair part coupled to the repair part engagement area; and
    an array of fasteners extending through the repair part, the splice plate, and the circumferential shape,
    wherein the repair part includes a pair of stiffening legs that have a leg thickness that is greater than the thickness of upper v-blade flange and the lower v-blade flange.

2. The forward frame v-blade according to claim 1 wherein the splice plate is coupled to a repair section of the circumferential shape, the repair section located at one or more of a twelve-o'clock repair section and a six-o'clock repair section.

3. The forward frame v-blade according to claim 2 wherein each of the stiffening legs have an outer surface, and wherein the repair part engagement area configured to align the outer surface with the outer surface of the upper v-blade flange and the lower v-blade flange.

4. The forward frame v-blade according to claim 2 further comprising a joint between the repair part and the circumferential shape, wherein the joint has a gap that does not exceed 0.005 in.

5. The forward frame v-blade according to claim 4 wherein the array of fasteners includes an equal number of fasteners on either side of the joint.

6. The forward frame v-blade according to claim 2 wherein the bending stress of the combination of the repair part, the splice plate, and the array of fasteners does not exceed about 26% of the bending stress for the forward frame v-blade as measured at a repair part web.

\* \* \* \* \*